United States Patent [19]
Engel et al.

[11] 3,871,769
[45] Mar. 18, 1975

[54] APPARATUS FOR DETERMINING THE DIAMETERS OF SMALL PARTICLES

[75] Inventors: Andreas Hermann Engel, Baltimore, Md.; Gerd Bernd Herziger, Gumligen; Theodor Heinrich Tschudi, Bern, both of Switzerland

[73] Assignee: Turlabor AG, Zumikon, Switzerland

[22] Filed: May 18, 1973

[21] Appl. No.: 361,625

[30] Foreign Application Priority Data
May 19, 1972 Switzerland.................... 007527/72

[52] U.S. Cl............................. 356/102, 350/162 SF
[51] Int. Cl. ......................................... G01n 15/02
[58] Field of Search.................... 356/102, 103, 104; 350/162 SF

[56] References Cited
UNITED STATES PATENTS
3,601,466  8/1971  Tsuruta................................ 350/3.5
3,666,359  5/1972  Lee................................ 350/162 SF

*Primary Examiner*—Ronald L. Wibert
*Assistant Examiner*—Conrad Clark

[57] ABSTRACT

Apparatus for determining the diameters of small particles by means of coherent light being scattered thereby, including holographic filters for converting the scattered light waves received from the particles exactly into spherical light waves only when said particles are of a predetermined diameter, said light waves then being passed through a lens and apertured diaphragm into separate light-measuring devices, each of which is associated with respectively one of said filters and which emits an electrical signal proportional to the intensity of the received light such as said signal becomes maximum when the diameter of the illuminated particle equals the predetermined particle diameter.

5 Claims, 2 Drawing Figures

APPARATUS FOR DETERMINING THE DIAMETERS OF SMALL PARTICLES

FIELD OF THE INVENTION

The present invention relates to an apparatus for determining the diameters of small particles, in which light is scattered by the particles.

DISCUSSION OF THE PRIOR ART

The determination of the diameters of small particles, particularly those in the range of 1 to 25 um, is relatively difficult to ascertain and is inexact with the use of present apparatuses, the latter of which utilize only the amplitude information carried by the diffused light, but fail to employ the phase information.

SUMMARY OF THE INVENTION

In order to increase the precision and concurrently accelerate the measuring process, the apparatus according to the present invention is particularly distinguished in that it comprises a source of coherent light which is scattered by the particles; which, furthermore, includes a plurality of holographic filters for filtering the scattered light waves, wherein the filters convert the scattered waves generated by particles of predetermined diameter into spherical waves, in which the output waves of these filters are directed through a lens and apertured diaphragm onto a separate light-measuring apparatus, each of which is associated with respectively one of said filters, and each providing a signal being linearly dependent upon the intensity of the illumination and reaches a maximum value when the particle diameter is equal to the predetermined diameter. By observing the light-measuring apparatus it is possible to obtain information with respect to the diameter of the particles and, respectively, the size distribution of, for example, particles present in a suspension.

In order to formulate spherical waves from the scattered waves, the holographic filters must consider not only the amplitude, but also the phase of the scattered waves, which is possible, as is known, by means of holograms.

The determination of the particle diameters has considerable interest in various technological fields such as, for example, pharmacology, milling or material pulverizing technology, the manufacture of dispersion colors or copying powders for xerography, and the like. Small particles may, in a first approximation, be considered as spherically-shaped, inasmuch as due to their upper surface tension they have the tendency to actually assume spherical configurations.

BRIEF DESCRIPTION OF THE DRAWINGS

Referring in detail to the drawings which illustrate an exemplary embodiment of the invention, in which.

DETAILED DESCRIPTION

Figure 1:
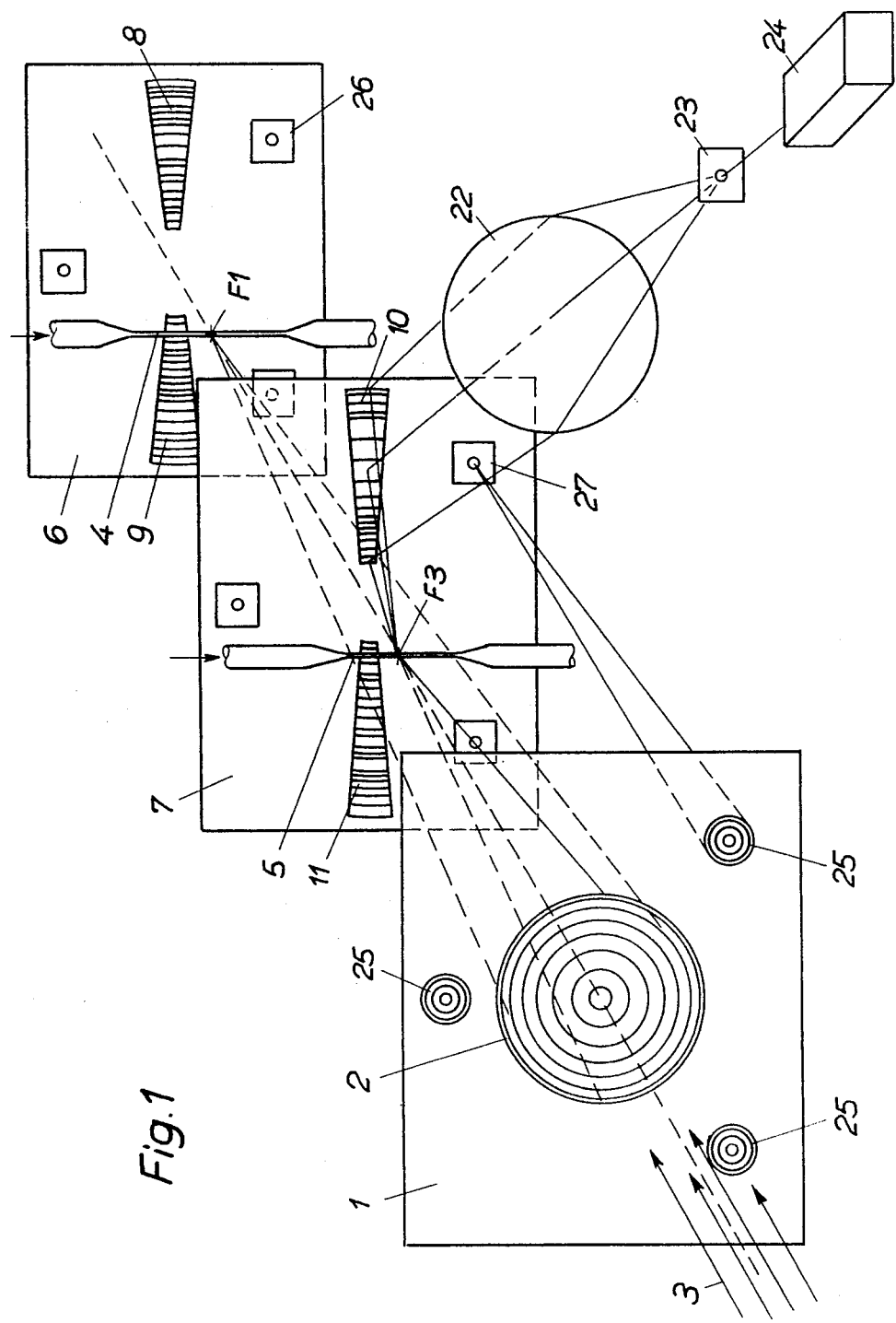
FIG. 1 illustrates a generally schematic view of an apparatus for determining the diameters of small particles.

The disclosed apparatus comprises a transparent support plate 1 on which there is formed, through concentric transparent and opaque circles a Fresnel-diffractive lens 2. A beam 3 consisting of parallel, coherent light rays which are generated by a suitable laser (not shown), and which impinge axially onto the said diffractive lens, is in a known manner focused by the lens into numerous focusing points. Of these focusing points, in FIG. 1 of the drawing, there is illustrated only the focusing point of the first order F1, and the focusing point of the third order F3. The focusing points F1 and F3 lie in the axes of two thin, transparent capillary tubes 4 and 5 which extend perpendicularly to the axis of the light beam, and through each tube there flows a stream of small particles such as, for example, particles suspended in a liquid or gas and, having diameters of, for example, approximately 1 to 10 $\mu$m. Rearwardly of the focusing points F1 and F3 there are located two transparent support plates 6 and 7 on which, by means of transparent and opaque arcuate strips, there are formed two sector-shaped holographic filters 8 and 9, and respectively, 10 and 11.

Figure 2:
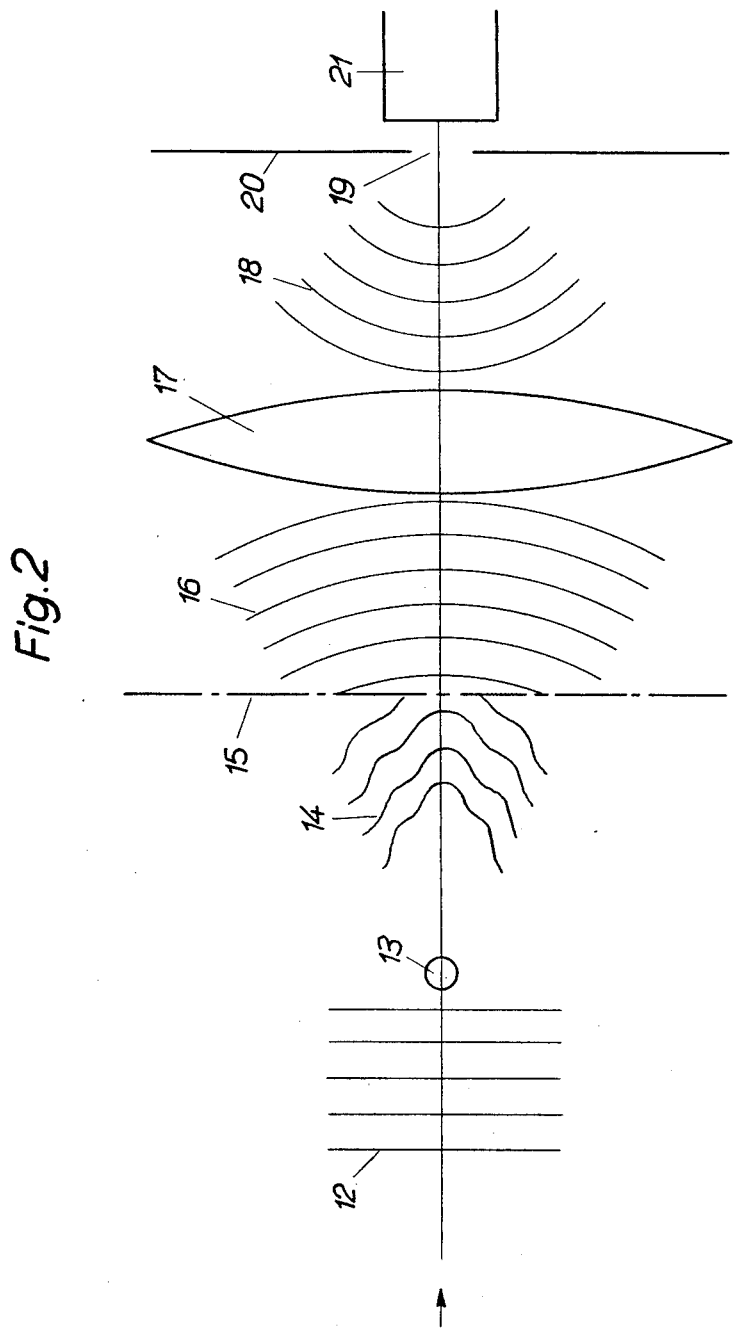
FIG. 2 illustrates a schematic arrangement of the wave propagation sequence of athe apparatus of FIG. 1.

In order to further elucidate the function of the holographic filters 8 through 11, reference is now had to FIG. 2 of the drawings. In FIG. 2 there is illustrated a planar wave shown propagated in the direction of the arrow as continuing, planar wave fronts 12. After being scattered by a small, approximately spherically-shaped particle 13, the resultantly deformed wave fronts 14 impinge against a holographic filter 15. The filter is constructed so that, when the particle 13 has a predetermined diameter, the scattered wave fronts 14 are transformed into spherical wave fronts 16, in effect, the output wave of the filter is a spherical wave when the particle has the particular size of diameter for which the filter 15 has been constructed.

For the construction of the filter it may be precisely calculated, employing for example, the concept of Mie's Scattering Theory, how the scattered wave fronts 14 will propagate for a particle of a predetermined diameter. On that basis, considering the amplitude and phase distribution of the scattered wave, the filter strips can be calculated and formed on the support plates.

The divergent spherical wave 16 is converted by a lens 17 into a converging spherical wave 18, which then passes through an extremely small aperture 19 formed in an apertured diaphragm 20 so as to project onto a light-measuring apparatus 21, the latter of which generates a signal or indication being proportional to the intensity of the impinging light. If the diameter of the particle 13 does not correspond with the filter value, the waves 18 are not spherically-shaped so as to pass only with losses through aperture 19 toward the measuring apparatus 21. The larger the extent of deviation of the particle diameter with respect to the filter value, the larger is also the deviation of the indication or signal with reference to a maximum signal value.

Each of the filters 8 through 11 shown in FIG. 2 includes a lens with a subsequent apertured diaphragm and measuring apparatus. However, illustrated in FIG. 1 are only the lens 22, the apertured diaphragm 23, and the light-measuring apparatus 24 associated with the filter 10. It is assumed thereby that the filter 10 is mirrored, whereby the spherically-shaped output wave is directed not rearwardly but in a forward direction.

If, for example, the filters 10 and 11 respectively have filter values of 3 $\mu$m and 5 $\mu$m, and the signals from both their associated light-measuring apparatuses are approximately equal in intensity, then the suspended particles streaming through the tube 5 will have a diameter of approximately 4 μm. The light-measuring apparatuses associated with the filters 8 and 9 which have filter values, for example, of respectively 8 and 10 μm, will then provide practically no signals or indication; while through the tube 4 there are subsequently conducted particles equal to those passing through the tube 5.

The reason that the filters 8 through 11 are sector-shaped, and the light beam axis does not extend in rotational symmetry (such as filter 15 in FIG. 2) is, that as a rule the beams 3 generated by the laser are polarized; and in order to convert the diffused waves into spherical waves, the strips of the holographic filters needed not only be varied radially but also in the peripheral direction, which was extremely complicated. Furthermore, two filters could not be located in the same filter plane. In order to produce a spherical wave it was adequate to provide throughout a sector-shaped filter. It was immaterial that the wave preceding the focal points F1 and F3, in actuality was not completely planar, as has been assumed with respect to FIG. 2, since within the purview of the caustic, this could be assumed with adequate approximation, in effect, deviations could be considered for the calculation of the holographic filters.

Inasmuch as it is extremely important that the plates 6 and 7 extend parallel to plate 1, and have a precisely calculated distance with respect thereto, plate 1 further is provided with three Fresnel-diffractive lenses 25, which are appreciably smaller than lens 2, and which have oppositely positioned thereto three marking apertured diaphragms 26 and, respectively, 27, located in plates 6 and, respectively, 7. Upon mounting of the apparatus, the laser beams are axially conveyed in sequence through lenses 25, and the plates 6 and 7 are so located so that the beams are precisely focused in the apertures of the respective marking apertured diaphragms 26 and 27.

In the described apparatus there are utilized only the focal points of the first and third order, F1 and F3, of the Fresnel-diffractive lens 22. Advantageously, there is also utilized the focal point of the fifth order (F5), in effect, there is also provided a third capillary tube for the conveyance of particles, having this focal pint (F5) located in its axis. Additionally, there is also provided another support plate with two filters and subsequent lenses, apertured diaphragms and light-measuring apparatuses, in which the filter values of these two filters may be, for example, 1 μm and 2 μm, respectively.

In order to avoid detrimental refractory effects, the plates 1, 6 and 7, as well as the capillary tubes 4 and 5 may be located in a housing which is filled with an immersion liquid whose refractive index corresponds to that of the material of the capillary tubes. The housing is constructed with suitable windows for the outlet of the spherical output waves emanating from the filters, and the windows purposefully having a spherical shape in conformance with the corresponding spherical wave fronts.

The focal width and the aperture angle of the lens 2 are suitably selected so that the focal point diameter, in effect, the diameter of the caustic, is approximately three times as large as the diameter of the particle being measured in the particular focal point. In the largest focal point F1, by means of the associated filter 8 and 9, particles are measured in the size range of 5 to 10 μm, in the focal point F3 particles are measured in the range of approximately 1.5 to 5 μm, and in the not illustrated smallest focal point, particles of approximately 1 to 2.5 μm. The diameter of the capillary tubes is not particularly critical. The size of the focal points determines the preselection of the particles, which may then be measured with the subsequent filters.

Principally, the holographic filters may also be constructed by photographic plates using the scattered wave of predetermined particles which, however, is technically extremely difficulat and requires precise knowledge of the exact particle sizes. Thus, the calculation and the synthetic manufacture of holographic filters is much more precise.

Furthermore, instead of a Fresnel-diffractive lens there may be utilized a refractive lens, however, this is not quite as advantageous, inasmuch as there is no provision for a plurality of focal points whereby only a single pair of filters can be provided instead of a plurality of pairs.

While there has been shown what is considered to be the preferred embodiment of the invention, it will be obvious that modifications may be made which come within the scope of the disclosure of the specification.

What is claimed is:

1. An apparatus for determining the diameters of small particles in which coherent light is scattered by said particles and the scattered light wavefronts are substituted with wavefronts previously recorded on hologram filters, wherein the improvement comprises first lens means for collecting said coherent light into a plurality of focal points, a sample of said particles being disposed in each of said focal points, at least one hologram filter positioned behind each of said focal points, said hologram filters each being adapted to convert the light waves scattered by particles of a predetermined different diameter into output light waves having a spherical wavefront, separate light-measuring means associated with each of said hologram filters for receiving said output light waves from each of said hologram filters, second lens means and apertured diaphragm means being interposed between said hologram filters and the light-measuring means associated therewith and having said output light waves pass therethrough, said light-measuring means each generating an electrical signal in response to said output light waves received from said hologram filters, said signal being linearly dependent upon the intensity of the light received and attaining a maximum value when the diameter of illuminated particle is equal to the predetermined particle diameter at which the respective hologram filter emanates output light waves having a spherical wavefront.

2. An apparatus as claimed in claim 1, said hologram filters being sector-shaped.

3. An apparatus as claimed in claim 1, said first lens means comprising a Fresnel diffraction lens having at least two of said focal points, transparent capillary tube means being located in each focal point, said capillary tube means forming a flow passageway for a stream of said particles.

4. An apparatus as claimed in claim 3, comprising a support plate for said Fresnel diffraction lens; a plurality of further Fresnel diffraction lenses of reduced size being provided in said support plate; support plates for said hologram filters having marking apertured diaphragms, said further Fresnel diffraction lenses and said marking apertured diaphragms being adapted to be correlated for determining the exact spacial position between said lens and filter support plates.

5. An apparatus as claimed in claim 4, comprising a housing, said lens and filter support plates and said capillary tube means being located in said housing; an immersion fluid being contained in said housing, said immersion fluid having a refractive index corresponding to the refractive index of the material of said capillary tube means.

* * * * *